(12) United States Patent
Baker, II et al.

(10) Patent No.: US 11,583,064 B1
(45) Date of Patent: Feb. 21, 2023

(54) MOUTH PIECE TOOTHBRUSH

(71) Applicants: Henderson Baker, II, Alexandria, VA (US); Phillip Harrison Baker, Alexandria, VA (US)

(72) Inventors: Henderson Baker, II, Alexandria, VA (US); Phillip Harrison Baker, Alexandria, VA (US)

(*) Notice: Subject to any disclaimer, the term of this patent is extended or adjusted under 35 U.S.C. 154(b) by 257 days.

(21) Appl. No.: 17/020,916

(22) Filed: Sep. 15, 2020

(51) Int. Cl.
*A46B 9/04* (2006.01)
*A61C 17/22* (2006.01)
*A61C 17/20* (2006.01)
*A61C 17/34* (2006.01)

(52) U.S. Cl.
CPC .............. *A46B 9/045* (2013.01); *A61C 17/20* (2013.01); *A61C 17/228* (2013.01); *A61C 17/34* (2013.01); *A46B 2200/1066* (2013.01); *A61C 17/221* (2013.01)

(58) Field of Classification Search
CPC ....... A46B 9/045; A61C 17/228; A61C 17/20; A61C 17/3481; A61C 17/34
See application file for complete search history.

(56) References Cited

U.S. PATENT DOCUMENTS

| | | | |
|---|---|---|---|
| 4,224,710 A | 9/1980 | Solow | |
| 4,237,574 A * | 12/1980 | Kelly | A61C 17/20 15/21.1 |
| 7,082,638 B2 | 8/2006 | Koh | |
| D603,101 S | 10/2009 | Hirshberg | |
| 9,526,597 B2 | 12/2016 | Steur | |
| 2009/0208898 A1 | 8/2009 | Kaplan | |
| 2009/0276972 A1 | 11/2009 | Dugan | |
| 2011/0154595 A1 | 6/2011 | Hill | |

FOREIGN PATENT DOCUMENTS

| | | | | |
|---|---|---|---|---|
| KR | 10-2010-0097505 | * | 9/2010 | ............. A46B 9/045 |
| KR | 10-1944714 | * | 1/2019 | ............. A61C 17/22 |

OTHER PUBLICATIONS

Computer generated English translation of KR 10-1944714, Ji, Jan. 2019. (Year: 2019).*

* cited by examiner

*Primary Examiner* — Laura C Guidotti
(74) *Attorney, Agent, or Firm* — Kyle A. Fletcher, Esq.

(57) ABSTRACT

The mouth piece toothbrush is a medical device. The mouth piece toothbrush is adapted for use with a patient. The mouth piece toothbrush is a mouthpiece. The mouth piece toothbrush is adapted for use in cleaning the dentition of the patient. The mouth piece toothbrush comprises a dental tray, a plurality of cleaning structures, and a control circuit. The dental tray houses the plurality of cleaning structures and the control circuit. The plurality of cleaning structures clean the dentition of the patient. Each of the plurality of cleaning structures is an electrically powered device. The control circuit controls the operation of the plurality of cleaning structures. The dental tray simultaneously receives the mandibular dental arch and the maxillary dental arch for cleaning.

19 Claims, 5 Drawing Sheets

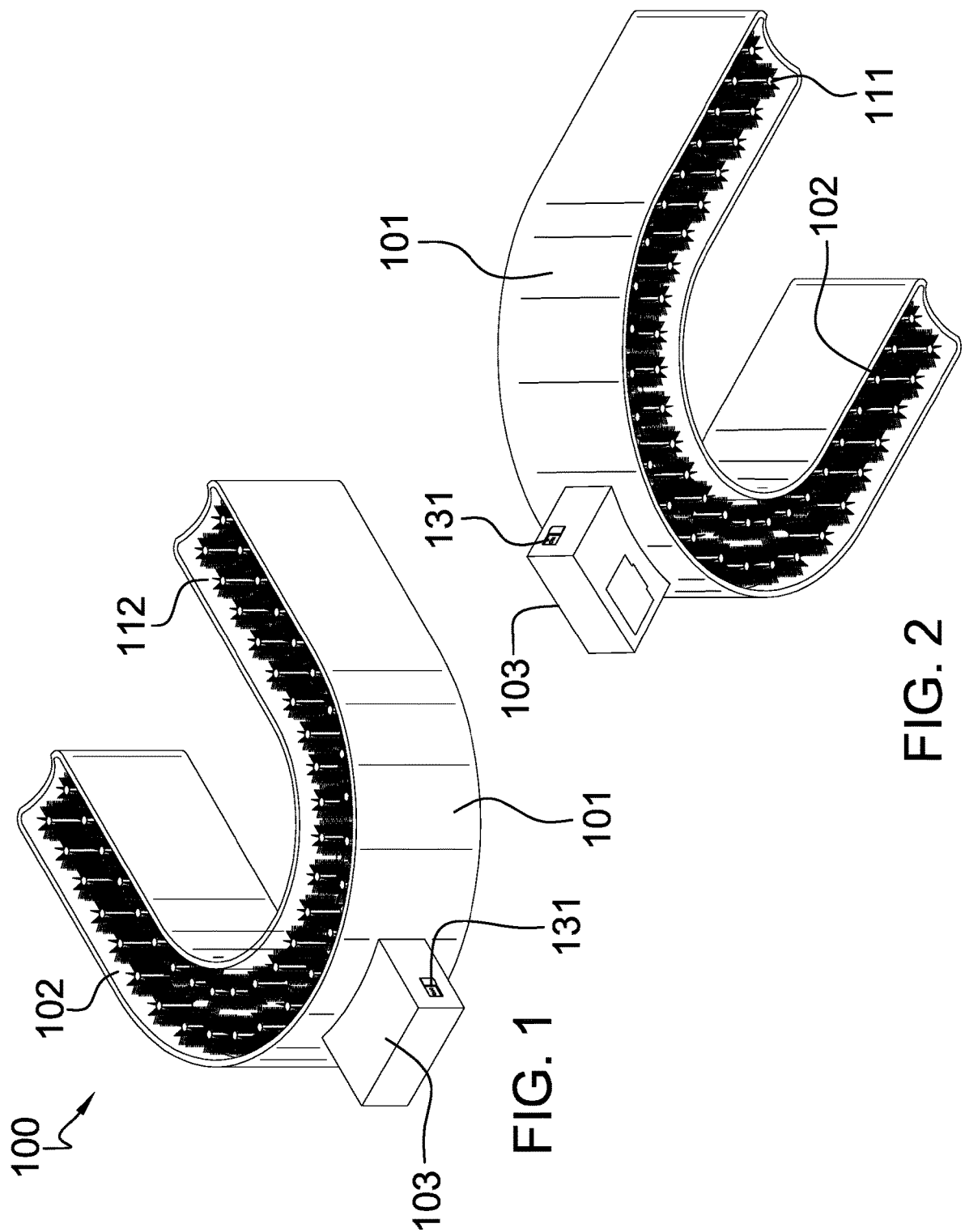

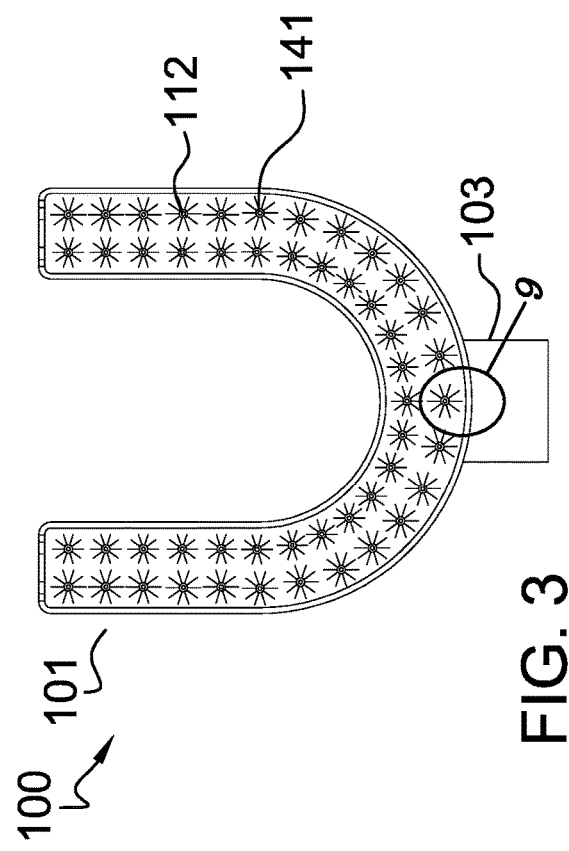
FIG. 3
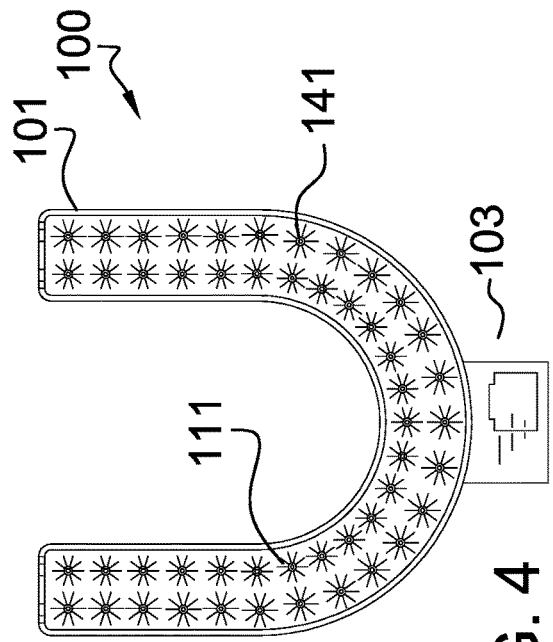
FIG. 4
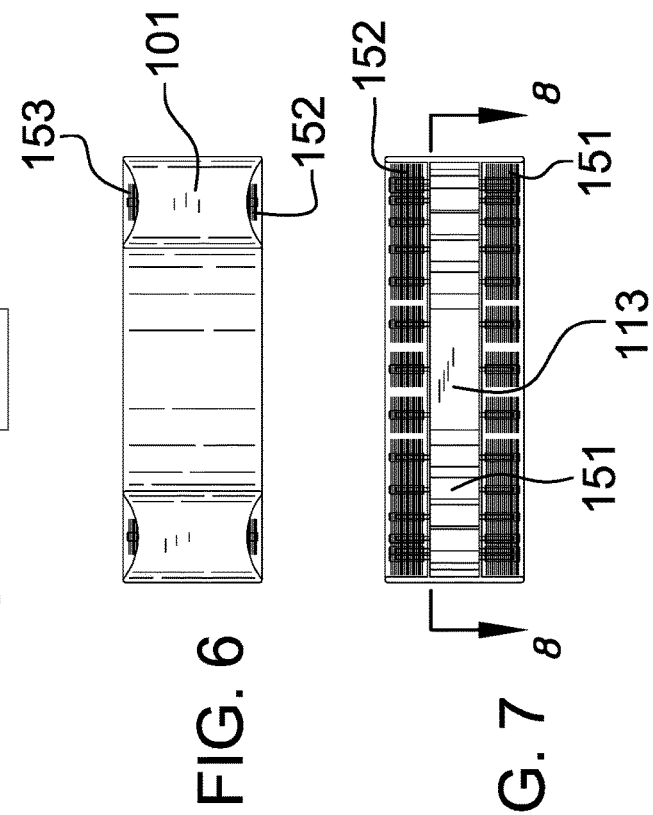
FIG. 6
FIG. 7
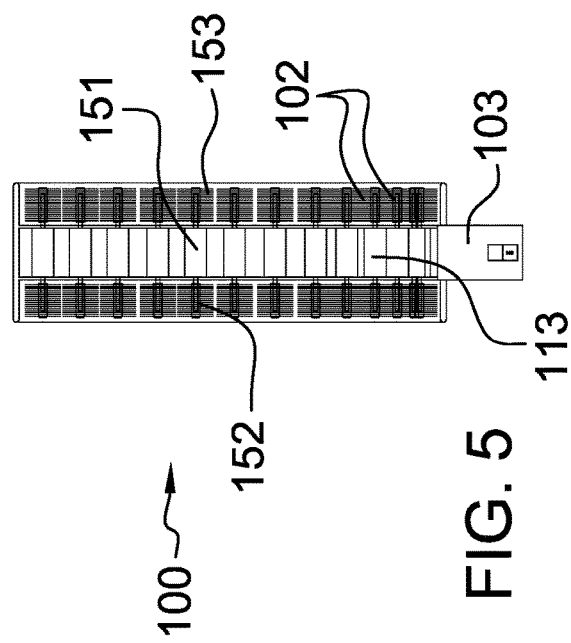
FIG. 5

US 11,583,064 B1

MOUTH PIECE TOOTHBRUSH

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

FIELD OF THE INVENTION

The present invention relates to the field of medical and veterinary science including dentistry, more specifically, a device for cleaning teeth.

SUMMARY OF INVENTION

The mouth piece toothbrush is a medical device. The mouth piece toothbrush is adapted for use with a patient. The mouth piece toothbrush is a mouthpiece. The mouth piece toothbrush is adapted for use in cleaning the dentition of the patient. The mouth piece toothbrush comprises a dental tray, a plurality of cleaning structures, and a control circuit. The dental tray houses the plurality of cleaning structures and the control circuit. The plurality of cleaning structures clean the dentition of the patient. Each of the plurality of cleaning structures is an electrically powered device. The control circuit controls the operation of the plurality of cleaning structures. The dental tray simultaneously receives the mandibular dental arch and the maxillary dental arch for cleaning.

These together with additional objects, features and advantages of the mouth piece toothbrush will be readily apparent to those of ordinary skill in the art upon reading the following detailed description of the presently preferred, but nonetheless illustrative, embodiments when taken in conjunction with the accompanying drawings.

In this respect, before explaining the current embodiments of the mouth piece toothbrush in detail, it is to be understood that the mouth piece toothbrush is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mouth piece toothbrush.

It is therefore important that the claims be regarded as including such equivalent construction insofar as they do not depart from the spirit and scope of the mouth piece toothbrush. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 1 is a perspective view of an embodiment of the disclosure.

FIG. 2 is a reverse perspective view of an embodiment of the disclosure.

FIG. 3 is a superior view of an embodiment of the disclosure.

FIG. 4 is an inferior view of an embodiment of the disclosure.

FIG. 5 is a cross-sectional view of an embodiment of the disclosure.

FIG. 6 is a front view of an embodiment of the disclosure.

FIG. 7 is a rear view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 8:
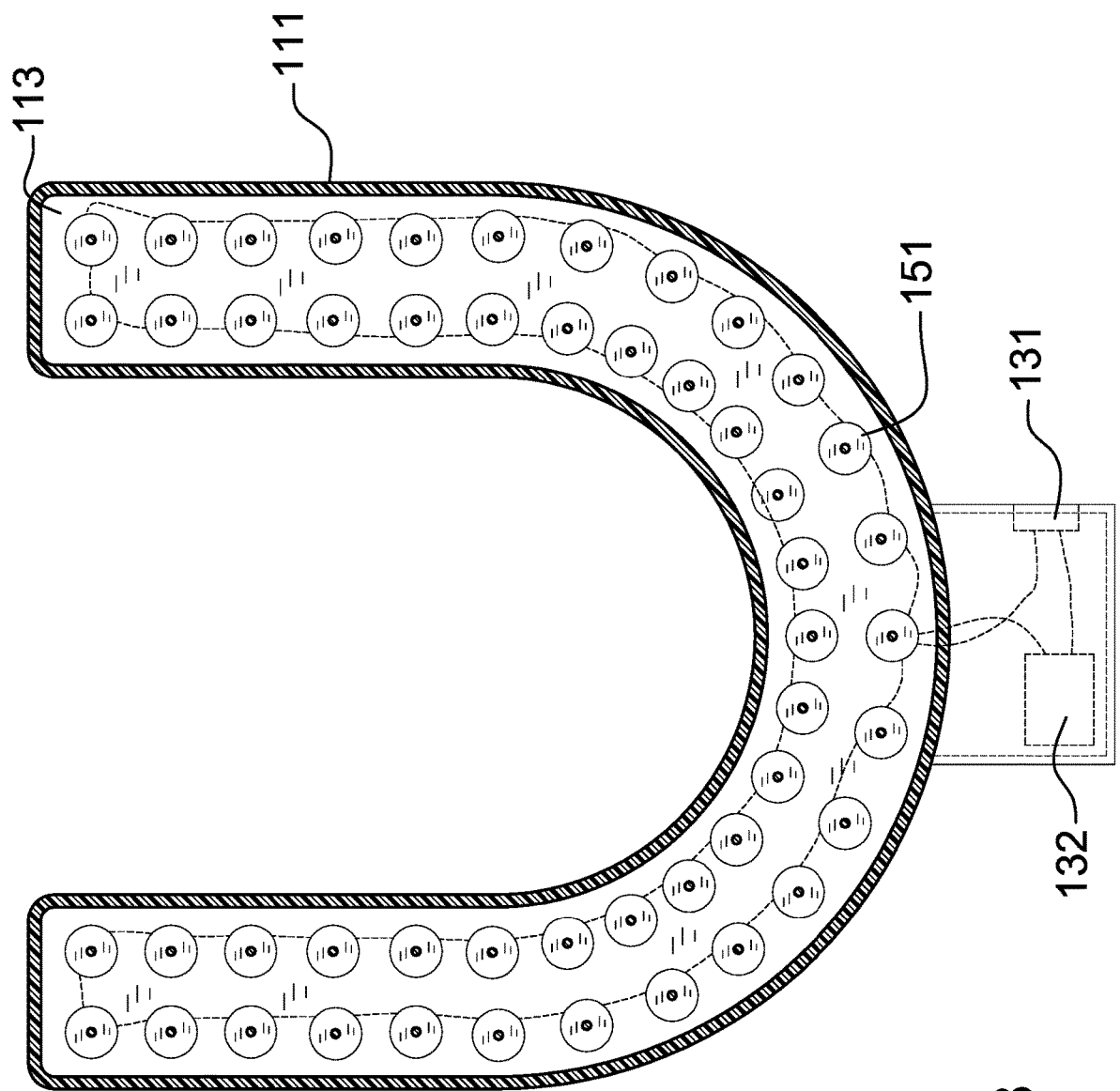
FIG. 8 is a cross-sectional view of an embodiment of the disclosure across 8-8 as shown in FIG. 7.
Figure 9:
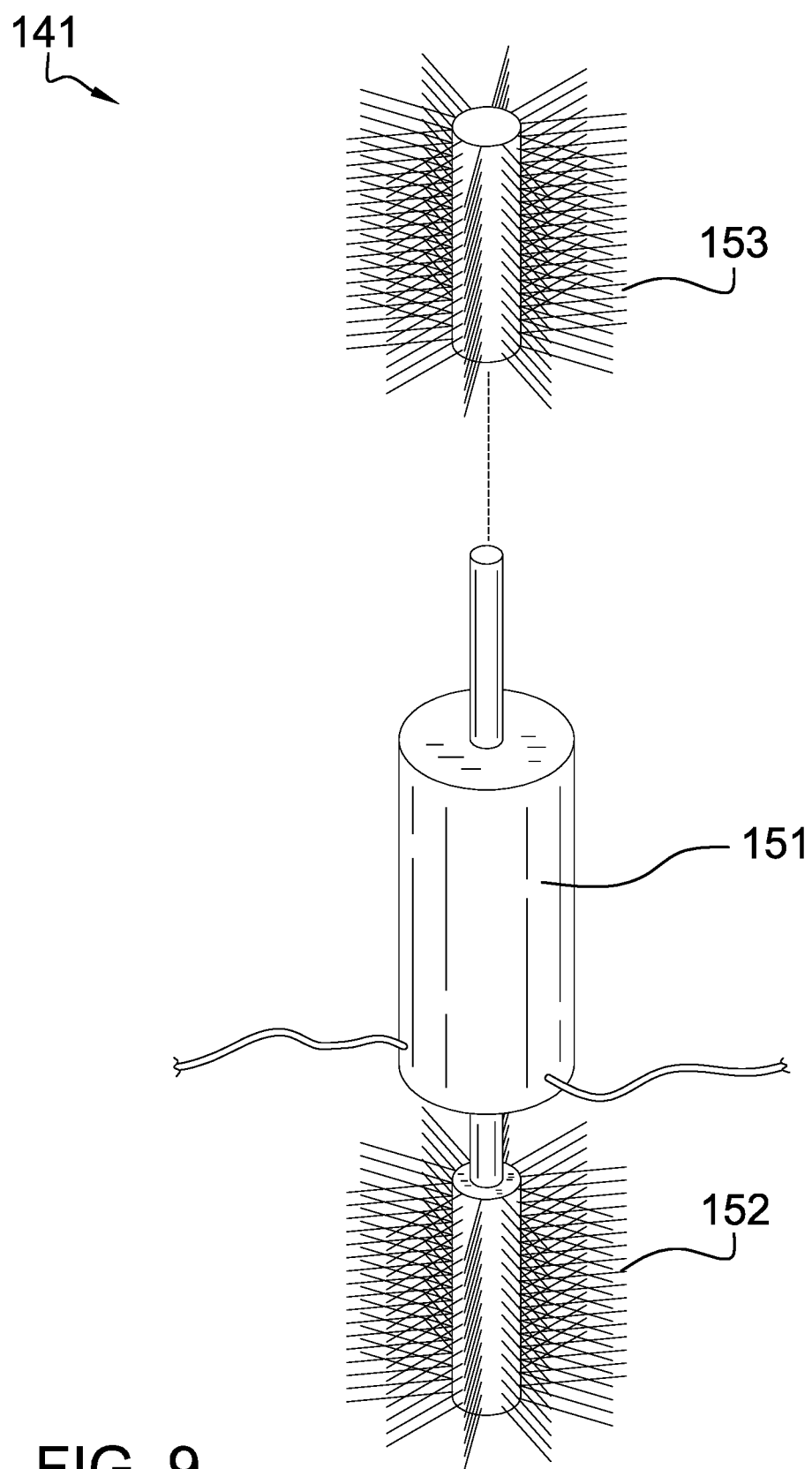
FIG. 9 is a detail view of an embodiment of the disclosure.
Figure 10:
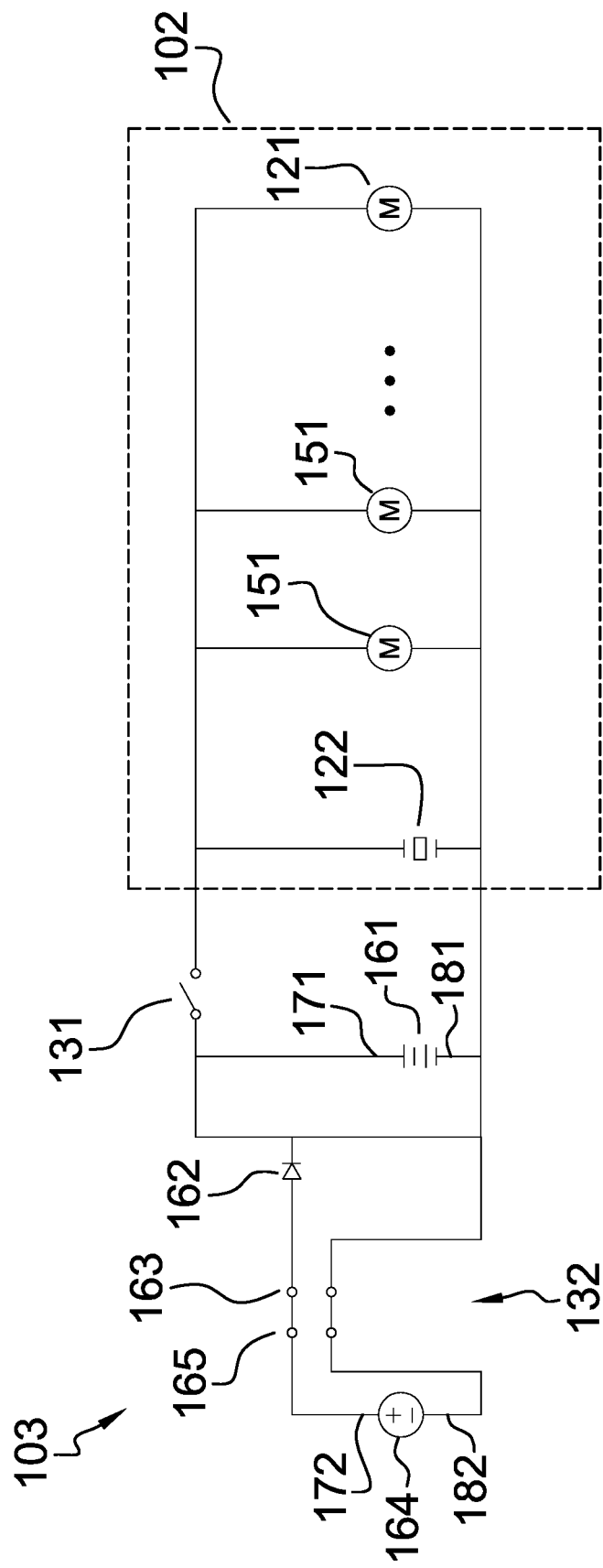
FIG. 10 is a schematic view of an embodiment of the disclosure.

Detailed reference will now be made to one or more potential embodiments of the disclosure, which are illustrated in FIGS. 1 through 10.

The mouth piece toothbrush 100 (hereinafter invention) is a medical device. The invention 100 is adapted for use with a patient. The invention 100 is a mouthpiece. The invention 100 is adapted for use in cleaning the dentition of the patient. The invention 100 comprises a dental tray 101, a plurality of cleaning structures 102, and a control circuit 103. The dental tray 101 houses the plurality of cleaning structures 102 and the control circuit 103. The plurality of cleaning structures 102 clean the dentition of the patient. Each of the plurality of cleaning structures 102 is an electrically powered device. The control circuit 103 controls the operation of the plurality of cleaning structures 102. The dental tray 101 simultaneously receives the mandibular dental arch and the maxillary dental arch for cleaning.

The dental tray 101 is a mouthpiece that inserts into the mouth of the patient. The dental tray 101 is a mechanical structure. The dental tray 101 is a semi-rigid structure. The dental tray 101 is formed as an irregular prism structure. The dental tray 101 has the structure of a center capped tube. The center capped tube and the irregular prism shape are defined elsewhere in this disclosure. The shape of the irregular prism structure of the dental tray 101 is geometrically similar to a mandible dental arch. The shape of the irregular prism structure of the dental tray 101 is geometrically similar to a maxillary dental arch. The dental tray 101 houses the plurality of cleaning structures 102 and the control circuit 103. The dental tray 101 comprises a mandibular pan 111, a maxillary pan 112, and a bit chamber 113.

The mandibular pan 111 is a pan shaped structure. The mandibular pan 111 has an irregular prism shape. The shape of the irregular prism structure of the mandibular pan 111 is geometrically similar to the mandibular dental arch such that the mandibular dental arch can insert into the hollow interior of the pan structure of the mandibular pan 111. The mandibular dental arch enters the mandibular pan 111 through the open face of the pan structure of the mandibular pan 111. The bit chamber 113 forms the closed face of the pan structure of the mandibular pan 111.

The maxillary pan 112 is a pan shaped structure. The maxillary pan 112 has an irregular prism shape. The shape of the irregular prism structure of the maxillary pan 112 is geometrically similar to the maxillary dental arch such that the maxillary dental arch can insert into the hollow interior of the pan structure of the maxillary pan 112. The maxillary dental arch enters the maxillary pan 112 through the open face of the pan structure of the maxillary pan 112. The bit chamber 113 forms the closed face of the pan structure of the maxillary pan The mandibular pan 111 attaches to the bit chamber 113 at the congruent end of the irregular disk structure of the bit chamber 113 with the greatest surface area. The mandibular pan 111 is geometrically similar to the congruent end of the irregular disk structure of the bit chamber 113. The maxillary pan 112 attaches to the bit chamber 113 at the congruent end of the irregular disk structure of the bit chamber 113 that is distal from the mandibular pan 111. The maxillary pan 112 is geometrically similar to the congruent end of the irregular disk structure of the bit chamber 113. The open face of the pan structure of the mandibular pan 111 forms a congruent end of the dental tray 101. The open face of the pan structure of the maxillary pan 112 forms the congruent end of the dental tray 101 that is distal from the mandibular pan 111.

The bit chamber 113 is a prism shaped structure. The bit chamber 113 has an irregular prism shape. The bit chamber 113 forms a hollow semi-rigid shell. The bit chamber 113 forms the closed face of the pan structure of the mandibular pan 111. The bit chamber 113 forms the closed face of the pan structure of the maxillary pan 112. The bit chamber 113 contains the control circuit 103 and the plurality of cleaning structures 102. The bit chamber 113 is formed with all apertures and form factors necessary to allow the bit chamber 113 to accommodate the use and operation of the control circuit 103 and the plurality of cleaning structures 102. Methods to form a bit chamber 113 suitable for the purposes described in this disclosure are well-known and documented in the mechanical arts.

The shape of the irregular prism structure of the bit chamber 113 is geometrically similar to the mandibular pan 111. The shape of the irregular prism structure of the bit chamber 113 is geometrically similar to the maxillary pan 112. The bit chamber 113 forms the barrier structure that is characteristic of the center capped tube structure that forms the dental tray 101.

Each of the plurality of cleaning structures 102 is an electromechanical device. Each of the plurality of cleaning structures 102 cleans the dentition of the patient. Each of the plurality of cleaning structures 102 access the dentition of the patient through a pan selected from the group consisting of the mandibular pan 111 and the maxillary pan 112. The plurality of cleaning structures 102 comprises a plurality of brush structures 121 and an ultrasonic device 122.

The plurality of brush structures 121 forms a plurality of abrasive surfaces used to clean detritus from the dentition of the patient. Each of the plurality of brush structures 121 is a brush. Each of the plurality of brush structures 121 is a rotating structure. Each of the plurality of brush structures 121 is an electrically powered structure. The rotation of each of the plurality of brush structures 121 forms an abrasive surface that removes detritus on the dentition of the patient. The rotation of each of the plurality of brush structures 121 cleans the dentition of the patient while the dentition is contained in the dental tray 101. The control circuit 103 controls the operation of the plurality of brush structures 121. The plurality of brush structures 121 comprises a collection of individual brush structures 141.

The individual brush structure 141 is an electromechanical device. The individual brush structure 141 is a rotating structure. The individual brush structure 141 generates a rotating abrasive surface within the mandibular pan 111 of the dental tray 101. The rotating abrasive surface of the individual brush structure 141 cleans a portion of the dentition of the mandible dental arch that is inserted into the mandibular pan 111 of the dental tray 101. The individual brush structure 141 generates a rotating abrasive surface within the maxillary pan 112 of the dental tray 101. The rotating abrasive surface of the individual brush structure 141 cleans a portion of the dentition of the maxilla dental arch that is inserted into the maxillary pan 112 of the dental tray 101. The individual brush structure 141 comprises an electric brush motor 151, a mandibular brush 152, and a maxillary brush 153.

The electric brush motor 151 is an electric motor. The electric brush motor 151 is fully contained within the bit chamber 113. The electric brush motor 151 of any first individual brush structure 141 electrically connects in parallel with the electric brush motor 151 of any second individual brush structure 141 selected from the plurality of brush structures 121. The electric brush motor 151 converts electrical energy into rotational mechanical energy. The control circuit 103 controls the operation of the electric brush motor 151.

The mandibular brush 152 is a brush structure. The mandibular brush 152 has a prism-shaped base with a plurality of bristles. Each of the plurality of bristles attaches to the prism-shaped base such that each of the plurality of bristles projects radially away from the mandibular brush 152. The mandibular brush 152 attaches to the electric brush motor 151 such that the center axis of the prism structure of the mandibular brush 152 aligns with the center of rotation of the electric brush motor 151. The mandibular brush 152 projects through the congruent end of the prism structure of the bit chamber 113 such that the plurality of bristles of the mandibular brush 152 are accessible from the interior of the mandibular pan 111.

The maxillary brush 153 is a brush structure. The maxillary brush 153 has a prism-shaped base with a plurality of bristles. Each of the plurality of bristles attaches to the prism-shaped base such that each of the plurality of bristles projects radially away from the maxillary brush 153. The maxillary brush 153 attaches to the electric brush motor 151 such that the center axis of the prism structure of the maxillary brush 153 aligns with the center of rotation of the electric brush motor 151. The maxillary brush 153 attaches to the end of the electric brush motor 151 that is distal from the mandibular brush 152. The maxillary brush 153 projects through the congruent end of the prism structure of the bit chamber 113 such that the plurality of bristles of the maxillary brush 153 are accessible from the interior of the maxillary pan 112.

The ultrasonic device 122 is a piezoelectric crystal. The ultrasonic device 122 is configured to vibrate such that the ultrasonic device 122 generates wave-based energy in the ultrasonic frequency range. The ultrasonic energy generated by the ultrasonic device 122 is targeted at the dentition of the patient while the dentition is contained within both the mandibular pan 111 and the maxillary pan 112 of the dental tray 101. The ultrasonic energy generated by the ultrasonic device 122 removes detritus from the dentition of the patient. The control circuit 103 controls the operation of the ultrasonic device 122.

The control circuit 103 is an electric circuit. The control circuit 103 provides the electric power required to operate the plurality of cleaning structures 102. The control circuit 103 controls the flow of electricity into the plurality of cleaning structures 102. The control circuit 103 comprises a master switch 131 and a power circuit 132. The master switch 131, the power circuit 132, the plurality of brush structures 121, and the ultrasonic device 122 are electrically interconnected.

The control circuit 103 is an independently powered electric circuit. By independently powered is meant that the control circuit 103 can operate without an electrical connection to an external power source 164.

The master switch 131, the power circuit 132, and the plurality of cleaning structures 102 are wired in a series circuit. The plurality of brush structures 121 of the plurality of cleaning structures 102 and the ultrasonic device 122 of the plurality of cleaning structures 102 are wired together into a parallel sub-circuit within the series circuit structure formed by the master switch 131, the master switch 131, and the plurality of cleaning structures 102.

The master switch 131 is a maintained electrical switch. The master switch 131 is wired in series between the power circuit 132 and the plurality of cleaning structures 102 such that the master switch 131 controls the flow of electric energy into the plurality of cleaning structures 102. The master switch 131 is essentially the power switch of the invention 100.

The power circuit 132 is an electrical circuit. The power circuit 132 powers the operation of the control circuit 103. The power circuit 132 is an electrochemical device. The power circuit 132 converts chemical potential energy into the electrical energy required to power the control circuit 103. The power circuit 132 comprises a battery 161, a diode 162, a charging port 163, and an external power source 164. The external power source 164 further comprises a charging plug 165. The battery 161, the diode 162, the charging port 163, the external power source 164, and the charging plug 165 are electrically interconnected. The battery 161 is further defined with a first positive terminal 171 and a first negative terminal 181. The external power source 164 is further defined with a second positive terminal 172 and a second negative terminal 182.

The battery 161 is an electrochemical device. The battery 161 converts chemical potential energy into the electrical energy used to power the control circuit 103. The battery 161 is a commercially available rechargeable battery 161. The chemical energy stored within the rechargeable battery 161 is renewed and restored through the use of the charging port 163. The charging port 163 is an electrical circuit that reverses the polarity of the rechargeable battery 161 and provides the energy necessary to reverse the chemical processes that the rechargeable battery 161 initially used to generate the electrical energy. This reversal of the chemical process creates a chemical potential energy that will later be used by the rechargeable battery 161 to generate electricity.

The charging port 163 forms an electrical connection to an external power source 164 using a charging plug 165. The charging plug 165 forms a detachable electrical connection with the charging port 163. The charging port 163 receives electrical energy from the external power source 164 through the charging plug 165. The diode 162 is an electrical device that allows current to flow in only one direction. The diode 162 installs between the rechargeable battery 161 and the charging port 163 such that electricity will not flow from the first positive terminal 171 of the rechargeable battery 161 into the second positive terminal 172 of the external power source 164. In the first potential embodiment of the disclosure, the external power source 164, the charging plug 165, and the charging port 163 are compatible with USB power requirements.

The following definitions were used in this disclosure:

Abrasion: As used in this disclosure, abrasion refers to the rubbing of a first object against a second object in a manner that generates friction.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Battery: As used in this disclosure, a battery is a chemical device consisting of one or more cells, in which chemical energy is converted into electricity and used as a source of power. Batteries are commonly defined with a positive terminal and a negative terminal.

Bit: As used in this disclosure, a bit refers to a structure intended for insertion into a patient's mouth. A bit is often called a mouthpiece.

Bristle: As used in this disclosure, a bristle is a short coarse stiff hair or hair like object.

Brush: As used in this disclosure, a brush is a device comprising a plurality of bristles set into a handle or a base that is used for grooming, sweeping, smoothing, scrubbing, or painting.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center Capped Tube: As used in this disclosure, a center capped tube is a tube with a first open end, a second open end, and a barrier that is fabricated within the tube. The barrier prevents the flow of liquid or gas from the first open end of the tube through to the second open end of the tube.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Dental Arch: As used in this disclosure, the dental arch refers to the curvature formed by the dentition. There are two dental arches in a person that are commonly referred to as the superior dental arch and the inferior dental arch.

Dental Tray: As used in this disclosure, a dental tray is a trough-shaped structure that is curved to match the dental arches of the dentition of a person. The dentition of the person is inserted into the trough structure of the dental tray.

Dentition: As used in this disclosure, a dentition refers to a set of teeth and a set of descriptive characteristics of the set of teeth especially with regard to their number, kind, arrangement, and condition.

Detritus: As used in this disclosure, detritus refers to plaque, calculus, and stains that accretes on a tooth.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter. Include Radial Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Circuit: As used in this disclosure, an electric circuit is a closed loop path through which electrons flow. The closed loop will generally initiate and terminate at an electrical power source.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Housing: As used in this disclosure, a housing is a rigid structure that encloses and protects one or more devices.

Maintained Switch: A used in this disclosure, a maintained switch is a switch that maintains the position that was set in the most recent switch actuation. A maintained switch works in an opposite manner to a momentary switch.

Mandible: As used in this disclosure, the mandible is the lower jaw bone of a human being.

Mandibular: As used in this disclosure, mandibular means pertaining or related to the mandible.

Maxilla: As used in this disclosure, the maxilla is the upper jaw bone of a human being.

Maxillary: As used in this disclosure, maxillary means pertaining or related to the maxilla.

Motor: As used in this disclosure, a motor refers to the method of transferring energy from an external power source into rotational mechanical energy.

Mouthpiece: A mouthpiece is a structure designed to fit into a patient's mouth.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Parallel Circuit: As used in this disclosure, a parallel circuit refers to a method of electrically connecting a plurality of circuit elements to a voltage source. In a parallel circuit each circuit element receives a voltage equal to the full voltage produced by the voltage source.

Patient: As used in this disclosure, a patient is a person who is designated to receive a medical treatment, therapy, or service. The term patient may be extended to an animal when used within the context of the animal receiving veterinary treatment or services.

Perimeter: As used in this disclosure, a perimeter is one or more curved or straight lines that bounds an enclosed area on a plane or surface. The perimeter of a circle is commonly referred to as a circumference.

Piezoelectric Effect: As used in this disclosure, the piezoelectric effect refers to a class of materials wherein a strain placed upon the material will result in a redistribution of electrons within the material in a manner that causes an electric charge. This electric charge can be measured as a voltage potential across the material. This effect can be reversed in some of these materials such that the application of an AC voltage to the material will cause a vibration within the material. A material commonly used to take advantage of the piezoelectric effect is polyvinylidene difluoride (CAS 24937-79-9) which is also known as PVDF.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

Rotation: As used in this disclosure, rotation refers to the cyclic movement of an object around a fixed point or fixed axis. The verb of rotation is to rotate.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Series Circuit: As used in this disclosure, a series circuit refers to a method of electrically connecting a plurality of circuit elements to a voltage source. In a series circuit, the proportion of the voltage received by each individual circuit element is divided proportionally between the plurality circuit elements based on the resistance (or impedance) of each circuit element relative to the total resistance of the plurality of circuit elements. The series circuit forms a linear or loop structure often referred to as a daisy chain.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tray: As used in this disclosure, a tray is a disk-shaped pan structure.

Tube: As used in this disclosure, the term tube is used to describe a rigid hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Ultrasonic: As used in this disclosure, ultrasonic is understood to be the transmission of energy using waves through a medium wherein the frequency of the wavelength is greater than 20 kHz. This disclosure assumes that the range of the wavelength is between 20 kHz and 20 MHz. By medium is meant a substance in a gas, liquid, or solid phase.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

With respect to the above description, it is to be realized that the optimum dimensional relationship for the various components of the invention described above and in FIGS. 1 through 10 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A dental mouthpiece comprising
a dental tray, a plurality of brush structures, and a control circuit;
wherein the dental tray houses the plurality of brush structures and the control circuit;
wherein the dental mouthpiece is a medical device;
wherein the dental mouthpiece is adapted for use with a dentition;
wherein the plurality of brush structures clean the dentition;
wherein each of the plurality of brush structures is an electrically powered device;
wherein the control circuit controls the operation of the plurality of brush structures;
wherein the control circuit comprises a master switch and a power circuit;
wherein the master switch, the power circuit, the plurality of brush structures, and an ultrasonic device are electrically interconnected;
wherein the control circuit is an independently powered electric circuit so that the control circuit can operate without an electrical connection to an external power source;
wherein the master switch, the power circuit, and the plurality of cleaning structures are wired in a series circuit.

2. The dental mouthpiece according to claim 1
wherein the dental tray is a mouthpiece;
wherein the dental tray is a mechanical structure;
wherein the dental tray is a semi-rigid structure;
wherein the dental tray is formed as an irregular prism structure;
wherein the dental tray includes a center capped tube.

3. The dental mouthpiece according to claim 2;
wherein the control circuit provides the electric power required to operate the plurality of cleaning structures;
wherein the control circuit controls a flow of electricity into the plurality of cleaning structures.

4. The dental mouthpiece according to claim 3
wherein the dental tray comprises a mandibular pan, a maxillary pan, and a bit chamber;
wherein the mandibular pan is a pan shaped structure;
wherein the maxillary pan is a pan shaped structure;
wherein the bit chamber forms a barrier structure that is characteristic of the center capped tube structure that forms the dental tray;
wherein each of the plurality of cleaning structures access a pan selected from the group consisting of the mandibular pan and the maxillary pan;
wherein each of the plurality of brush structures is an electromechanical device.

5. The dental mouthpiece according to claim 4
wherein the bit chamber forms a closed face of the pan structure of the mandibular pan;
wherein the bit chamber forms the closed face of the pan structure of the maxillary pan.

6. The dental mouthpiece according to claim 5
wherein the mandibular pan has an irregular prism shape;
wherein the maxillary pan has an irregular prism shape;
wherein the shape of the irregular prism structure of the maxillary pan is geometrically similar to the maxillary.

7. The dental mouthpiece according to claim 6
wherein the mandibular pan attaches to the bit chamber at a congruent end of an irregular disk structure of the bit chamber with the greatest surface area;
wherein the maxillary pan attaches to the bit chamber at the congruent end of the irregular disk structure of the bit chamber that is distal from the mandibular pan.

8. The dental mouthpiece according to claim 7
wherein the mandibular pan is geometrically similar to the congruent end of the irregular disk structure of the bit chamber;
wherein the maxillary pan is geometrically similar to the congruent end of the irregular disk structure of the bit chamber.

9. The dental mouthpiece according to claim 8
wherein an open face of the pan structure of the mandibular pan forms a congruent end of the dental tray;
wherein the open face of the pan structure of the maxillary pan forms the congruent end of the dental tray that is distal from the mandibular pan.

10. The dental mouthpiece according to claim 9
wherein the bit chamber is a prism shaped structure;
wherein the bit chamber has an irregular prism shape;
wherein the bit chamber forms a hollow semi-rigid shell;
wherein the bit chamber forms the closed face of the pan structure of the mandibular pan;
wherein the bit chamber forms the closed face of the pan structure of the maxillary pan;
wherein the bit chamber contains the control circuit and the plurality of cleaning structures.

11. The dental mouthpiece according to claim 10
wherein the shape of the irregular prism structure of the bit chamber is geometrically similar to the mandibular pan;
wherein the shape of the irregular prism structure of the bit chamber is geometrically similar to the maxillary pan.

12. The dental mouthpiece according to claim 11 wherein the plurality of brush structures comprises an ultrasonic device;
wherein the plurality of brush structures forms a plurality of abrasive surfaces used to clean detritus from the dentition;
wherein each of the plurality of brush structures is a brush;
wherein each of the plurality of brush structures is a rotating structure;
wherein each of the plurality of brush structures is an electrically powered structure;
wherein the rotation of each of the plurality of brush structures forms an abrasive surface that removes detritus on the dentition;
wherein the rotation of each of the plurality of brush structures cleans the dentition while the dentition is contained in the dental tray;
wherein the control circuit controls the operation of the plurality of brush structures.

13. The dental mouthpiece according to claim 12
wherein the plurality of brush structures comprises a collection of individual brush structures;
wherein the individual brush structure is an electromechanical device;
wherein the individual brush structure is a rotating structure;

wherein the individual brush structure generates a rotating abrasive surface within the mandibular pan of the dental tray;

wherein the rotating abrasive surface of the individual brush structure cleans a portion of the dentition of the mandible dental arch that is inserted into the mandibular pan of the dental tray;

wherein the individual brush structure generates a rotating abrasive surface within the maxillary pan of the dental tray;

wherein the rotating abrasive surface of the individual brush structure cleans a portion of the dentition of the maxilla dental arch that is inserted into the maxillary pan of the dental tray.

14. The dental mouthpiece according to claim 13
wherein the ultrasonic device is a piezoelectric crystal;
wherein the ultrasonic device vibrates such that the ultrasonic device generates wave-based energy in the ultrasonic frequency range;
wherein the ultrasonic energy generated by the ultrasonic device is targeted at the dentition while the dentition is contained within both the mandibular pan and the maxillary pan of the dental tray;
wherein the ultrasonic energy generated by the ultrasonic device removes detritus from the dentition;
wherein the control circuit controls the operation of the ultrasonic device.

15. The dental mouthpiece according to claim 14
wherein the individual brush structure comprises an electric brush motor, a mandibular brush, and a maxillary brush;
wherein the electric brush motor is an electric motor;
wherein the electric brush motor is fully contained within the bit chamber;
wherein the electric brush motor of any first individual brush structure electrically connects in parallel with the electric brush motor of any second individual brush structure selected from the plurality of brush structures;
wherein the electric brush motor converts electrical energy into rotational mechanical energy;
wherein the control circuit controls the operation of the electric brush motor;
wherein the mandibular brush is a brush structure;
wherein the mandibular brush has a prism-shaped base with a plurality of bristles;
wherein each of the plurality of bristles attaches to the prism-shaped base such that each of the plurality of bristles projects radially away from the mandibular brush;
wherein the mandibular brush attaches to the electric brush motor such that the center axis of the prism structure of the mandibular brush aligns with the center of rotation of the electric brush motor;
wherein the mandibular brush projects through the congruent end of the prism structure of the bit chamber such that the plurality of bristles of the mandibular brush are accessible from the interior of the mandibular pan;
wherein the maxillary brush is a brush structure;
wherein the maxillary brush has a prism-shaped base with a plurality of bristles;
wherein each of the plurality of bristles attaches to the prism-shaped base such that each of the plurality of bristles projects radially away from the maxillary brush;
wherein the maxillary brush attaches to the electric brush motor such that the center axis of the prism structure of the maxillary brush aligns with the center of rotation of the electric brush motor;
wherein the maxillary brush attaches to the end of the electric brush motor that is distal from the mandibular brush;
wherein the maxillary brush projects through the congruent end of the prism structure of the bit chamber such that the plurality of bristles of the maxillary brush are accessible from the interior of the maxillary pan.

16. The dental mouthpiece according to claim 15 wherein the plurality of brush structures and the ultrasonic device are wired together into a parallel sub-circuit within the series circuit structure formed by the master switch, the master switch, and the plurality of brush structures.

17. The dental mouthpiece according to claim 16
wherein the master switch is a maintained electrical switch;
wherein the master switch is wired in series between the power circuit and the plurality of brush structures such that the master switch controls the flow of electric energy into the plurality of brush structures;
wherein the master switch is essentially the power switch of the dental mouthpiece.

18. The dental mouthpiece according to claim 17
wherein the power circuit is an electrical circuit;
wherein the power circuit powers the operation of the control circuit;
wherein the power circuit is an electrochemical device;
wherein the power circuit converts chemical potential energy into the electrical energy required to power the control circuit;
wherein the power circuit comprises a battery, a diode, a charging port, and an external power source;
wherein the external power source further comprises a charging plug;
wherein the battery, the diode, the charging port, the external power source, and the charging plug are electrically interconnected;
wherein the battery is further defined with a first positive terminal and a first negative terminal;
wherein the external power source is further defined with a second positive terminal and a second negative terminal.

19. The dental mouthpiece according to claim 17
wherein the battery is a rechargeable battery;
wherein the charging port is an electrical circuit that reverses the polarity of the rechargeable battery and provides the energy necessary to reverse the chemical processes that the rechargeable battery initially used to generate the electrical energy;
wherein the charging port forms an electrical connection to an external power source using a charging plug;
wherein the charging plug forms a detachable electrical connection with the charging port;
wherein the charging port receives electrical energy from the external power source through the charging plug;
wherein the diode is an electrical device that allows current to flow in only one direction;
wherein the diode installs between the rechargeable battery and the charging port such that electricity will not flow from the first positive terminal of the rechargeable battery into the second positive terminal of the external power source.

* * * * *